United States Patent Office 3,098,970
Patented July 23, 1963

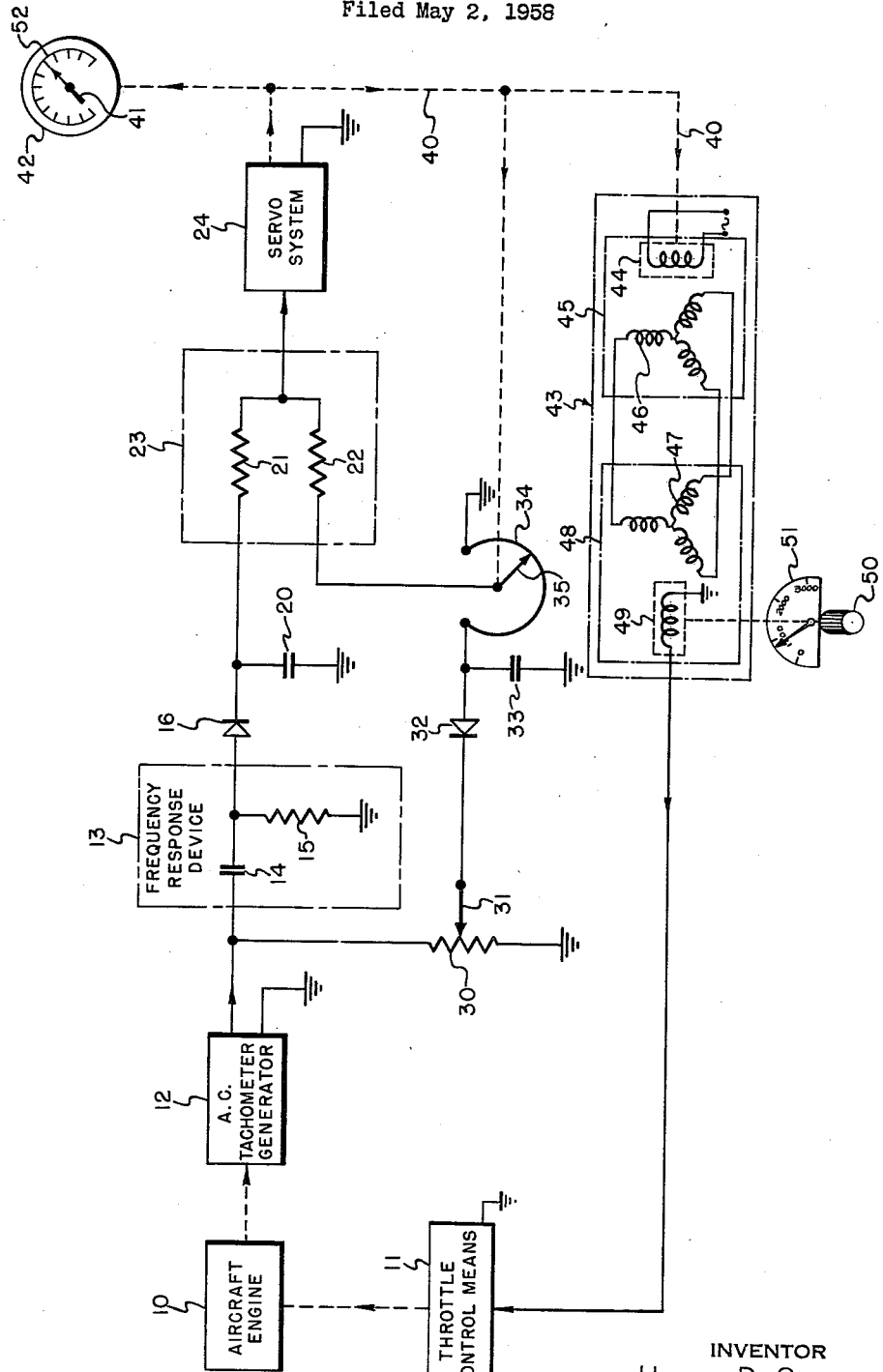

3,098,970
SPEED RESPONSIVE SYSTEM
Harry D. Smith, Massapequa Park, N.Y., assignor to Sperry Rand Corporation, Great Neck, N.Y., a corporation of Delaware
Filed May 2, 1958, Ser. No. 732,639
9 Claims. (Cl. 324—70)

This invention relates to speed responsive systems. More particularly, the invention concerns a speed responsive system that is responsive to the characteristic of a speed signal which is accurately indicative of speed and is unresponsive to the characteristic susceptible of undesired variations.

A speed signal, particularly of a motive means, such as, the revolutions per minute (r.p.m.) of an aircraft engine, is generally obtained from a signal generating device driven by the motive means. The signal generating device is usually an A.C. tachometer generator connected to provide an output substantially dependent on the speed of the engine. The A.C. output of the tachometer generator has an amplitude substantially proportional to the engine speed but susceptible of undesired variations and a frequency accurately indicative of the engine speed.

Previously, the amplitude of the tachometer generator output has been used to provide an indication of engine speed. However, the amplitude of the tachometer generator output suffers from several inherent disadvantages which render it unacceptable for speed responsive systems especially where extreme accuracy of response is desired. The amplitude of the generator output is subject to undesired variations including those caused by changes in the ambient temperature and aging of the generator. Further, commercially available tachometer generators have an output voltage versus speed characteristic that is unacceptable for certain applications and particularly for control purposes, where a certain amount of power must be supplied by the generator, the output is only linear over a limited engine speed range.

The principal object of the present invention is to provide a speed responsive system that is extremely accurate over a wide speed range.

Another object of the present invention is to provide a speed responsive system that is responsive to the characteristic of a speed signal that is accurately indicative of speed and is unresponsive to the characteristic susceptible of undesired variations.

A further object of the present invention is to provide a speed responsive system having a high output voltage versus speed characteristic.

The above objects are achieved by the present invention by connecting an A.C. tachometer generator in driven relation to an engine for providing an output signal from the generator substantially in accordance with the speed of the engine. The A.C. output of the generator has an amplitude and a frequency wherein the amplitude is proportional to the product of an amplitude gradient susceptible of undesired variations and the speed, and the frequency is proportional to the speed. First circuit means responsive to the generator output provides a first signal proportional to the product of the amplitude gradient and the square of the speed. Second circuit means also responsive to the generator output provides a second signal proportional to the product of the amplitude gradient and the speed. By dividing the first signal by the second signal, the undesired amplitude gradient variations may be cancelled out and the quotient is an unusually accurate signal proportional to the speed. The quotient may then be used to provide a speed indication or a shaft rotation proportional to engine speed adaptable as a direct visual indication or as a controlling element in a speed controlling system.

Theoretically, one approach to the understanding of the present invention is to assume the use of a two pole A.C. tachometer generator. A two pole A.C. tachometer generator is assumed for ease of explanation to avoid complicating the theory by a factor relating to the number of poles of the generator. It is to be understood, however, that the invention is applicable to any multipole A.C. tachometer generator. The output of a two pole A.C. tachometer generator may be expressed as $$E_G = E_i \sin nt$$

where $E_G$ is the instantaneous value of the A.C. tachometer generator output voltage,
$E_i$ is the amplitude of the output voltage of the A.C. tachometer generator, and
$n$ is the speed of the generator in radians per second and the frequency of the output voltage of the A.C. tachometer generator is proportional to $n$.

The amplitude $E_i$ of the output voltage may also be expressed as $$E_i = K_1 n$$

where $K_1$ is the voltage amplitude gradient of the generator in volts per radian per second; i.e., it is proportional to the slope of the voltage versus speed curve of the tachometer generator operating at a particular set of conditions. The amplitude gradient $K_1$ is not a constant but is susceptible of undesired variations caused by changes in the ambient temperature, and aging of the generator as well as other factors.

The generator output instantaneous voltage $E_G$ may then be written as $$E_G = K_1 n \sin nt$$

To obtain a signal from the generator that is accurately indicative of speed, it is necessary to eliminate the variations due to the amplitude gradient, $K_1$.

One method of eliminating the amplitude gradient errors is to utilize the frequency of the generator output voltage $E_G$ to obtain a voltage having an amplitude proportional to speed, $n$, and multiply it by $K_1 n$ to provide a voltage having an amplitude substantially proportional to the square of the speed, $K_1 n^2$. This may be accomplished by a frequency responsive device that provides an output having an amplitude related to its input by a factor that varies linearly as a function of the frequency of the input. Then, by dividing the speed squared term, $K_1 n^2$, by a term substantially proportional to speed, $K_1 n$, a quotient is obtainable proportional to $n$ and independent of the amplitude gradient errors inherent in $K_1$.

One way of explaining the above mathematically, neglecting factors unnecessary to the explanation, is to take the derivative of $E_G$ with respect to time to obtain a speed squared term:

$$\frac{dE_G}{dt} = K_1 n^2 \cos nt = E_1$$

If desired, the $\cos nt$ term may be eliminated by rectifying $E_1$ thereby resulting in a D.C. voltage $E_2$, $$E_2 \cong K_1 n^2$$

which is a D.C. voltage having a magnitude substantially proportional to the square of the tachometer generator speed.

To obtain a compatible D.C. voltage having a magnitude substantially proportional to the tachometer generator speed, a portion of the A.C. output of the tachometer generator may be rectified to provide a D.C. voltage $E_3$, $$E_3 \cong K_1 n$$

By dividing $E_2$ by $E_3$, the amplitude gradient errors in the numerator and the denominator cancel each other as follows:

$$E_0 \cong \frac{E_2}{E_3} \cong \frac{K_1 n^2}{K_1 n} \cong n$$

and an output voltage $E_0$ is obtained proportional to the generator speed, $n$, and independent of the errors inherent in the amplitude gradient, $K_1$, that is an extremely accurate speed signal.

If desired, in lieu of utilizing the magnitudes of the D.C. voltages, $E_2$ and $E_3$, the amplitudes of the corresponding A.C. voltages may be used by adjusting the phase differences to make the A.C. terms compatible.

The present invention will now be described with reference to the accompanying drawing which schematically illustrates a preferred embodiment of a speed responsive system of the present invention.

To provide an output voltage substantially in accordance with its speed, an engine 10 may be connected to drive a signal generating means such as an A.C. tachometer generator 12. The tachometer generator 12 may be a conventional multipole A.C. device driven at a speed equal to or proportional to the aircraft engine speed. The A.C. output of tachometer generator 12 is connected to a frequency responsive device indicated by the dotted enclosure 13.

The purpose of the frequency responsive device 13 is to provide an output signal having an amplitude related to its input by a factor that varies linearly as a function of the frequency of the input. In the particular embodiment shown, it is an R–C circuit consisting of series condenser 14 and parallel resistor 15. The transmission through the R–C circuit transfers $K_1 n \sin nt$ into $K_1 n^2 \cos nt$. Although the R–C circuit shown may be considered as a differentiating device whose operation may be analyzed in accordance with the foregoing theory, any device capable of providing an output signal having an amplitude related to its input by a factor that varies linearly as a function of the input frequency is equally adaptable for use in the present invention. It should be noted that in this particular application the R–C circuit shown differentiates the A.C. wave itself rather than the envelope of the signal.

Within frequency responsive device 13, the output of tachometer generator 12 is connected to one side of series condenser 14. The other side of condenser 14 is connected to one end of parallel resistor 15 and to one side of rectifier 16. The other side of resistor 15 is connected to ground potential. The other side of rectifier 16 is connected to one side of filter condenser 20 and to one end of resistor 21. The other side of filter condenser 20 is connected to ground potential. The other end of resistor 21 is connected to one end of resistor 22 to form an algebraic summation device indicated by the dotted enclosure 23. The junction of resistors 21 and 22 is connected to the input of servo system 24.

A portion of the A.C. output from tachometer generator 12 is also connected to one end of variable voltage divider 30 which has its other end connected to ground potential. Wiper 31 of variable voltage divider 30 is connected to one side of rectifier 32. The other side of rectifier 32 is connected to one side of filter condenser 33 and to one end of potentiometer 34. The other side of filter condenser 33 and the other end of potentiometer 34 are connected to ground potential. The slider arm 35 of potentiometer 34 is connected to the other end of resistor 22. The output shaft 40 of servo system 24 is connected to drivably position the slider arm 35 of potentiometer 34.

To provide an electrical output signal proportional to speed that may be adapted to numerous applications and particularly to provide a signal having a high output voltage versus speed characteristic for control purposes, the output shaft 40 may be connected, for example, to a synchro system 43. In the embodiment of the invention shown in the drawing, shaft 40 is connected to drive rotor 44 of synchro transmitter 45. The terminals of rotor 44 are connected to an A.C. supply. The windings of the stator 46 of transmitter 45 are connected to the corresponding windings of the stator 47 of synchro control transformer 48. The rotor 49 of control transformer 48 may be connected to be positioned by an r.p.m. reference control knob 50. The setting of reference knob 50 may be read against a scale 51 calibrated, for example, in thousands of r.p.m.

The output from rotor 49 is connected to provide, in the embodiment shown, a speed error signal to throttle control means 11. The throttle control means 11 is connected to aircraft engine 10 to control the speed of engine 10 in accordance with the electrical input to the throttle control means 11. Throttle control means 11 may be of the type disclosed in copending application Serial No. 739,537, entitled Speed Control System, and filed June 3, 1958, now Patent No. 2,961,052, in the names of Harry D. Smith et al.

The output shaft 40 may also be connected to provide a visual indication of the speed of aircraft engine 10 by connecting shaft 40 to drive pointer 41 of speed indicator 42.

In the operation of the embodiment of the invention shown in the drawing, aircraft engine 10 drives the A.C. tachometer generator 12 at a speed equal to or proportional to the speed of engine 10. In a conventional manner, an output voltage is induced in the windings of A.C. tachometer generator 12 having an amplitude and frequency dependent on the speed of engine 10. The generator output voltage $E_G$, as previously explained, is equal to $K_1 n \sin nt$ and is applied to frequency responsive device 13. The amplitude of the generator voltage contains the undesired amplitude gradient term $K_1$ and a term proportional to the generator speed, $n$. The frequency of the generator voltage is also proportional to the generator speed, $n$.

The generator output voltage, $E_G$, may be modified to a voltage having an amplitude proportional to frequency by designing frequency responsive device 13 to provide an output signal having an amplitude related to its input by a factor that varies linearly as a function of the frequency of the input. Since the amplitude of the generator voltage signal contains a speed term, $n$, and device 13 converts frequency to a signal having an amplitude proportional to speed, $n$, the transmission of the generator output voltage $E_G$ through device 13 will result in a speed squared output signal from device 13 of the form $K_1 n^2$.

When the frequency responsive device 13 is an R–C circuit as shown, the time constant of the R–C circuit is made small to make its amplitude response proportional to frequency and thereby provide an output signal of the form $K_1 n^2 \cos nt$. As explained previously, the R–C circuit may be theoretically considered as a differentiating type circuit with the time derivative of the A.C. output of the tachometer generator 12 taken across the R–C circuit to provide a speed squared term $E_1$. The output signal of the frequency responsive device 13 thus contains the speed squared term which becomes the numerator of the aforementioned equation.

To provide the basis for the denominator of the equation, a portion of the A.C. output voltage $E_G$ from tachometer generator 12 is tapped off through wiper 31 of variable voltage divider 30. The position of wiper 31 is adjusted to compensate for the attenuation of the signal through frequency responsive device 13.

To make the speed squared term $K_1 n^2 \cos nt$ from device 13 and the speed term $K_1 n \sin nt$ from voltage divider 30 compatible, the A.C. signals may be converted to D.C. signals having a magnitude corresponding to the amplitude of the respective A.C. signals. This may be done by means of rectifiers 16 and 32 to provide D.C.

signals $E_2$ and $E_3$ having a magnitude proportional to $K_1n^2$ and $K_1n$, respectively. The outputs of rectifiers 16 and 32 may be passed through filter condensers 20 and 33 to minimize the A.C. ripple on the D.C. signals, $E_2$ and $E_3$, respectively.

As explained previously, by obtaining the quotient of $K_1n^2$ with respect to $K_1n$, the amplitude gradient $K_1$ cancels out, leaving only a signal proportional to speed, $n$, that is independent of the undesired amplitude gradient variations. The signal proportional to speed $n$ may be obtained by any means suitable of supplying the quotient of the signal $E_2$ from rectifier 16 with respect to the signal $E_3$ from rectifier 32. One means of obtaining the above quotient is indicated in the drawing which shows a speed responsive system adaptable for control purposes as well as indicating purposes.

The D.C. signal $E_2$ from rectifier 16 is applied to resistor 21 of summation device 23. The D.C. signal $E_3$ from rectifier 32 is applied across potentiometer 34 and, depending upon the position of slider arm 35, a portion of the D.C. signal $E_3$ is applied to resistor 22 of summation device 23. Since rectifier 32 is polarized oppositely with respect to rectifier 16, the signal applied to resistor 22 will oppose the signal applied across resistor 21. The output from summation device 23 is applied to servo system 24 which rotates shaft 40 to position slider arm 35 of potentiometer 34 in accordance with the difference between signals $E_2$ and $E_3$.

Servo system 24 drives the slider arm 35 of potentiometer 34 until the signal $E_3$ to resistor 22 nulls out the signal $E_2$ to resistor 21 at which time the system is in the steady state condition. In this manner, the angle through which the slider arm 35 is driven to null the system is a function of the actual engine speed. This may be shown by calling the angle through which the slider arm 35 is driven, $\theta_0$. Then, in the steady state condition, $$E_2 - E_3 \frac{\theta_0}{\theta_m} = 0$$

where $\theta_m$ is the maximum rotation of the slider arm 35. By transposing $$\theta = \frac{E_2}{E_3}\theta_m$$

the angle $\theta_0$ through which the slider arm 35 is driven by shaft 40 is therefore proportional to the quotient of $E_2/E_3$, in the null condition of the servo system.

Since the position of slider arm 35 is determined by the amount of rotation of shaft 40, the position or amount of rotation of shaft 40 is in itself an extremely accurate indication of engine speed that is independent of amplitude gradient variations. The position of shaft 40 has many uses, one of which may be to drive a mechanical to electrical transducer to provide an output voltage having a quantitative characteristic that is proportional to the exact speed of engine 10. By connecting shaft 40 to drive a synchro system, such as 43, an output voltage is obtainable having a high output voltage versus speed characteristic that is adaptable to numerous applications.

In the embodiment shown, shaft 40 is adapted to drive an extremely precise engine speed controlling system by rotating the rotor 44 in accordance with the rotation of shaft 40. Voltages are thereby induced in the windings of stator 46 of transmitter 45 having a resultant voltage with an amplitude and a phase depending upon the amount and direction of rotation of shaft 40, respectively. The voltages induced in stator 46 are applied to the windings of stator 47 of control transformer 48.

The desired operating speed of the engine 10 is manually set by rotating knob 50 to the desired position as read against the calibrated scale 51. In a conventional manner, depending upon the position of rotor 49, a resultant voltage is induced in rotor 49 by the windings of stator 47 of control transformer 48 so that the output voltage from rotor 49 has an amplitude and a phase proportional to the magnitude and sense, respectively, of the deviation of the actual engine speed from the desired engine speed; i.e., a speed error voltage. The speed error voltage from rotor 49 drives throttle control means 11 to vary the aircraft engine speed until the system nulls out at exactly the desired engine speed as determined by the setting of knob 50.

While synchro system 43 has been used for purposes of example, other mechanical to electrical transducers may be utilized to provide an electrical output in any desired form as well as to provide a power gain. For example, a potentiometer having its slider arm positioned by the rotation of shaft 40 could be used to provide the desired output signal. The voltage applied across the potentiometer may be adjusted to provide the desired output voltage versus speed characteristic as well as an A.C. or D.C. output signal.

To provide an accurate indication of engine speed, the rotation of shaft 40 may also be used to rotate pointer 41 of speed indicator 42 and the position of pointer 41 may be read against calibrated dial 52 to furnish a visual indication of actual engine r.p.m.

In a typical speed responsive system designed in accordance with the teachings of the present invention to control the speed of an aircraft engine between 1500 r.p.m. and 3000 r.p.m., the following values are representative:

Condenser 14 _____ microfarads __ .047
Resistor 15 _____ ohms __ 5.1K

Variable voltage divider 30 is adjusted to apply to rectifier 32 approximately one-tenth the voltage applied to the R–C circuit.

While the present invention has been described with respect to a servo system wherein the quotient of the signals is obtained by means of a feedback loop, it is within the purview of the present invention to obtain a signal in accordance with frequency characteristics by the use of any other suitable quotient-obtaining means.

By merely changing the time constant of the R–C circuit by changing the values of condenser 14 and resistor 15, and adjusting voltage divider 30 accordingly, the speed responsive system of the present invention can be made effective to accommodate an unusually wide speed range. If desired, the capacitance and resistance of condenser 14 and resistor 15, respectively, may be made variable to provide a convenient means for not only varying the speed range over which the system is effective, but also means for adapting the system to the dynamics of various speed responsive system environments.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. In a speed responsive system, signal generating means for providing an A.C. output having an amplitude which varies in accordance with the product of its amplitude gradient which is susceptible of undesired variations and its speed, and a frequency proportional to said speed, means responsive to said output for providing a first signal which varies in accordance with the product of said amplitude gradient and the square of said speed, means responsive to said output for providing a second signal which varies in accordance with the product of said amplitude gradient and said speed, and means including quotient-obtaining means responsive to said first and second signals for providing the quotient of said first signal with respect to said second signal to provide a third signal proportional to said speed and independent of the undesired variations of said amplitude gradient.

2. In a speed responsive system, signal generating means for providing an A.C. output having an amplitude which varies in accordance with the product of its amplitude gradient which is susceptible of undesired variations and its speed, and a frequency proportional to said speed, means responsive to said output including frequency responsive means for obtaining a first signal which varies in accordance with said speed having an amplitude dependent upon said frequency and multiplying said first signal by said amplitude gradient and said speed for providing a second signal which varies in accordance with the product of said amplitude gradient and the square of said speed, means responsive to said output for providing a third signal which varies in accordance with the product of said amplitude gradient and said speed, and means including quotient-obtaining means responsive to said second and third signals for providing the quotient of said second signal with respect to said third signal to provide a fourth signal proportional to said speed and independent of the undesired variations of said amplitude gradient.

3. A system responsive to the speed of a motive means comprising A.C. tachometer generator means adapted to be connected in driven relation to the motive means for providing an A.C. output having an amplitude which varies in accordance with the product of the tachometer generator amplitude gradient which is susceptible of undesired variations and the speed of said motive means, and a frequency which varies in accordance with said speed, means responsive to said output for providing a first signal which varies in accordance with the product of said amplitude gradient and the square of said speed, means responsive to said output for providing a second signal which varies in accordance with the product of said amplitude gradient and said speed, and means including quotient-obtaining means responsive to said first and second signals for providing the quotient of said first signal with respect to said second signal to provide a third signal having a quantitative charateristic proportional to the speed of said motive means and independent of the undesired variations of said amplitude gradient.

4. A system responsive to the speed of a motive means comprising an A.C. tachometer generator connected in driven relation to the motive means for providing an A.C. output having an amplitude which varies in accordance with the product of the tachometer generator amplitude gradient which is susceptable of undesired variations and the speed of said motive means, and a frequency which varies in accordance with said speed, means including a frequency responsive device responsive to said output for providing a first signal which varies in accordance with the product of said amplitude gradient and the square of said speed, means responsive to said output for providing a second signal which varies in accordance with the product of said amplitude gradient and said speed, and means including quotient-obtaining means responsive to said first and second signals for obtaining the quotient of said first signal with respect to said second signal to provide a third signal proportional to the speed of said motive means and independent of the undesired variations of said amplitude gradient.

5. A system responsive to the speed of a motive means comprising an A.C. tachometer generator connected in driven relation to the motive means for providing an output of the form, $K_1 n \sin nt$, dependent on the speed of said motive means, a frequency responsive device responsive to said output for providing a first signal of the form, $K_1 n^2 \cos nt$, first rectifying means responsive to said first signal for providing a second signal of the form, $K_1 n^2$, second rectifying means responsive to said tachometer generator output for prviding a third signal of the form, $K_1 n$, and means responsive to said second and third signals for obtaining the quotient of said second signal with respect to said third signal to provide a fourth signal proportional to $n$ whereby undesired variations of $K_1$ are eliminated.

6. A system responsive to the speed of a motive means comprising an A.C. tachometer generator connected in driven relation to the motive means for providing an A.C. output dependent on the speed of said motive means, a frequency responsive device responsive to said A.C. output for providing a first signal substantially proportional to the square of said speed, first rectifying means responsive to said first signal for providing a second signal having a D.C. magnitude substantially proportional to the amplitude of said first signal, second rectifying means responsive to the A.C. output of said tachometer generator for providing a third signal having a D.C. magnitude substantially proportional to the amplitude of said A.C. output, and means responsive to said second and third signals for providing the quotient of said second signal with respect to said third signal to provide a fourth signal proportional to the speed of said motive means whereby the fourth signal is extremely accurate and independent of undesirable fluctuations.

7. A system of the character described in claim 6 wherein said last-mentioned means includes a potentiometer responsive to said third signal for providing a fifth signal and a servo system responsive to the algebraic summation of said second and fifth signals, said servo system having an output shaft drivably connected to said potentiometer for varying said fifth signal in feedback fashion to provide a shaft position proportional to the speed of said motive means.

8. A system of the character described in claim 7 including indicating means responsive to said shaft position for providing an indication of the speed of said motive means.

9. A system of the character described in claim 7 including controlling means connected to said motive means and responsive to said shaft position for controlling the speed of said motive means.

References Cited in the file of this patent

UNITED STATES PATENTS

| | | |
|---|---|---|
| 1,902,496 | Fitzgerald | Mar. 21, 1933 |
| 2,362,503 | Scott | Nov. 14, 1944 |
| 2,500,548 | Keller | Mar. 14, 1950 |
| 2,576,249 | Barney | Nov. 27, 1951 |
| 2,713,660 | Davis | July 19, 1955 |
| 2,875,575 | Peterson | Mar. 3, 1959 |
| 2,908,864 | Shepard | Oct. 13, 1959 |
| 2,958,038 | Kwast | Oct. 25, 1960 |